(12) United States Patent
Bingham

(10) Patent No.: US 8,087,824 B2
(45) Date of Patent: Jan. 3, 2012

(54) AIRCRAFT BRAKE ASSEMBLY HAVING A TEMPERATURE PROBE AND METHOD OF MOUNTING A TEMPERATURE PROBE IN A BRAKE ASSEMBLY

(75) Inventor: Douglas S. Bingham, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 331 days.

(21) Appl. No.: 11/878,764

(22) Filed: Jul. 26, 2007

(65) Prior Publication Data

US 2009/0213899 A1 Aug. 27, 2009

(51) Int. Cl.
  *G01K 1/00* (2006.01)
  *G01K 13/00* (2006.01)
  *G01K 13/08* (2006.01)

(52) U.S. Cl. ......... 374/141; 374/208; 374/153; 374/144

(58) Field of Classification Search .................. 374/141, 374/148, 153, 208, 179, 163, 183, 185, 120, 374/121, 130, 135, E1.018, 144, 147, 100; 29/428; 136/200; 356/43
See application file for complete search history.

(56) References Cited

U.S. PATENT DOCUMENTS

| | | | | |
|---|---|---|---|---|
| 2,741,919 A * | 4/1956 | Gaubatz | ........................ | 374/144 |
| 3,491,335 A | 1/1970 | MacConochie | | |
| 3,788,143 A * | 1/1974 | Gabriel | ........................ | 374/144 |
| 4,321,827 A * | 3/1982 | Anderson | ...................... | 374/183 |
| 4,569,600 A * | 2/1986 | Preniczny et al. | ............. | 374/131 |
| 4,658,936 A * | 4/1987 | Moseley | ................... | 188/1.11 R |
| 4,913,369 A * | 4/1990 | Lia et al. | ..................... | 242/405.2 |
| 5,044,770 A * | 9/1991 | Haghkar | ........................ | 374/208 |
| 5,392,716 A * | 2/1995 | Orschek et al. | .................. | 105/61 |
| 5,651,175 A * | 7/1997 | Grimes et al. | ................... | 29/605 |
| 5,668,529 A * | 9/1997 | Kyrtsos | ......................... | 340/454 |
| 5,862,890 A * | 1/1999 | Long et al. | ................... | 188/71.5 |
| 6,094,904 A * | 8/2000 | Goodrich et al. | ................ | 60/803 |
| 6,431,824 B2* | 8/2002 | Schotsch et al. | .............. | 415/115 |
| 2002/0004644 A1* | 1/2002 | Koblish | .......................... | 604/104 |
| 2004/0196888 A1* | 10/2004 | Musbach et al. | ............... | 374/120 |
| 2008/0092641 A1* | 4/2008 | Cahill et al. | ..................... | 73/121 |
| 2008/0164032 A1* | 7/2008 | Bertane | .......................... | 166/369 |

FOREIGN PATENT DOCUMENTS

JP 2003057125 A * 2/2003
JP 2004-61067 A 2/2004

OTHER PUBLICATIONS

Norwich Aero Thermocouples, 2007, http://www.norwichaero.com/products/temperature_sensors/thermocouples.stm.

* cited by examiner

*Primary Examiner* — Gail Verbitsky
(74) *Attorney, Agent, or Firm* — Shumaker & Sieffert, P.A.

(57) ABSTRACT

An aircraft brake assembly (10) includes a torque tube (16) having a passageway (18) for receiving a temperature probe, the passageway (18) having a wall and a width (W) and a length, and a temperature probe (20) having a width (w) less than the passageway width (W) and at least one angled portion (34, 36) where a centerline (44) of the temperature probe (20) changes direction. The temperature probe (20) has a lateral offset (L) greater than the passageway width (W) so that the probe (20) cannot be inserted into the passageway (18) without flexing it at the at least one angled portion (34, 36), and the temperature probe (20) is mounted in the passageway (18) and held in a flexed state by the passageway wall. Also a method of mounting a temperature probe in a brake assembly.

17 Claims, 2 Drawing Sheets

AIRCRAFT BRAKE ASSEMBLY HAVING A TEMPERATURE PROBE AND METHOD OF MOUNTING A TEMPERATURE PROBE IN A BRAKE ASSEMBLY

FIELD OF THE INVENTION

The present invention is directed toward an aircraft brake assembly having a temperature probe mounted in a passageway in a torque tube and toward a method of mounting a temperature probe in a torque tube, and, more specifically, toward an aircraft brake assembly having a temperature probe with an angled portion that can be flexed to fit the temperature probe into a torque tube passageway and toward a method of mounting a temperature probe in a torque tube that includes a step of flexing the temperature probe.

BACKGROUND OF THE INVENTION

An example of a portion of a conventional aircraft brake is illustrated in FIG. 4. This aircraft brake includes a plurality of spaced, parallel, stator disks 220 mounted on a torque tube 204. The torque tube 204 is connected to a housing which in turn is mounted to an aircraft (not illustrated). A plurality of parallel spaced rotor disks 206 connected to a wheel 208 project into the spaces between the stator disks 220 and rotate freely between the stator disks 220 when the aircraft wheel 208 rotates. A housing 210 mounted on the torque tube 204 supports one or more pistons 212, which may be electrically or hydraulically actuated, and that can be controllably driven against an outermost stator disk 214 to force the rotor and stator disks 202, 206 together to create friction and slow or stop the rotation of the wheel 208. An assembly of rotor and stator disks may be referred to as a "brake stack," and driving pistons against a brake stack to perform a braking operation may be referred to as compressing the brake stack.

It is known to provide a passageway 216 in the torque tube 204 for receiving a temperature probe 218 so that a temperature near the disk stack can be measured. The diameter of the temperature probe is generally selected to be slightly smaller than the diameter of the passageway 216 to facilitate the insertion and removal of the temperature probe. These temperature probes are generally mounted to the piston housing using a flange 222 at an outer end thereof and extend in a cantilevered manner into the passageway. While the gap between the temperature probe and the passageway is small, enough clearance remains so that the temperature probe can move and vibrate and thus flex repeatedly along its length under normal operating conditions. It has been found that these repeated vibrations cause the temperature probe to fail due to high cycle fatigue.

An interference fit between the temperature probe and the passageway might address this vibration problem, but given the length and other characteristics of the temperature probe, it would be difficult or impossible to mount a temperature probe in this manner. This vibration problem has been addressed in the past by wrapping the temperature probe with a metal or alloy mesh, a short section of which is illustrated as element 200 in FIG. 4, before inserting the temperature probe into the passageway. While this mesh reduces vibration, the high temperatures and conditions under which the probe operates have damaged the mesh and made the temperature probe difficult to remove from the passageway. In some cases, galvanic corrosion between the mesh and the passageway has bound the temperature probe in the passageway so tightly that the torque tube and temperature probe are both damaged during the removal process. It would therefore be desirable to provide a temperature probe that does not suffer from vibration induced cycle fatigue and which can be removed from a torque tube without damage.

SUMMARY OF THE INVENTION

These problems and others are addressed by embodiments of the present invention, a first aspect of which comprises a method of mounting an elongate temperature probe in a passageway of an aircraft brake assembly that includes providing a torque tube having a passageway with a width and a length, and providing a temperature probe with a width less than the passageway width and a lateral offset greater than the passageway width. The temperature probe also includes at least one angled portion where a centerline thereof changes direction. The method further involves inserting the temperature probe into the passageway to reduce the lateral offset of the temperature probe by flexing the temperature probe at the at least one angled portion so that the passageway holds the temperature probe in the flexed position against a return force generated by the flexed probe.

Another feature of the present invention comprises an aircraft brake assembly that includes a torque tube having a passageway for receiving an elongate temperature probe which passageway has a wall and a first width. A temperature probe having a second width less than the first width is mounted in the passageway. The temperature probe has a first portion spaced from the wall and angled toward a first location on the wall, a second portion spaced from the wall and angled away from the first location and a third portion between the first portion and the second portion in contact with the wall.

A further aspect of the invention comprises an aircraft brake assembly that includes a torque tube having a passageway for receiving a temperature probe which passageway has a wall and a width and a length. A temperature probe having a width less than the passageway width and at least one angled portion where a centerline of the temperature probe changes direction is mounted in the passageway. The temperature probe has a lateral offset greater than the passageway width so that the probe cannot be inserted into the passageway without flexing the temperature probe at the at least one angled portion, and the temperature probe is mounted in the passageway and held in a flexed state by the passageway wall.

BRIEF DESCRIPTION OF THE DRAWINGS

These aspects and features of the invention and others will be better understood after a reading of the following detailed description together with the following drawings wherein.

DETAILED DESCRIPTION

Figure 1:
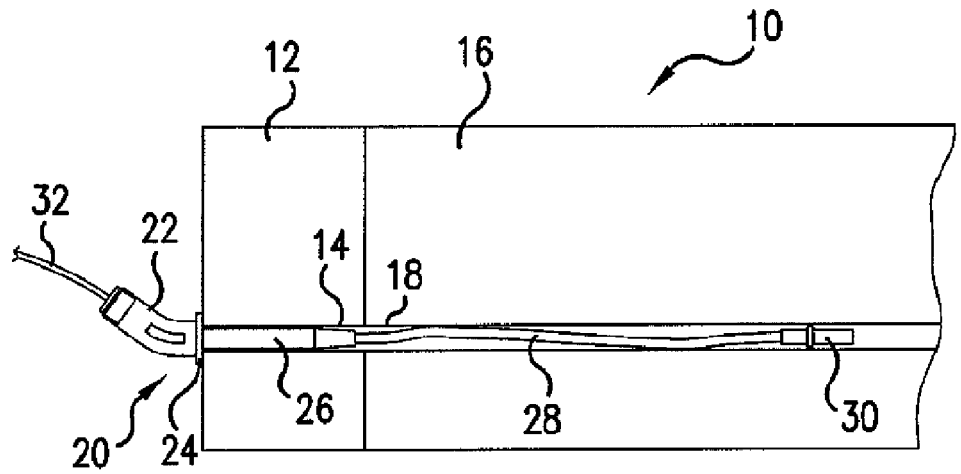
FIG. 1 is a side elevational view, partly in section, of a temperature probe according to an embodiment of the present invention mounted in a passageway in an aircraft brake assembly.
Figure 4:
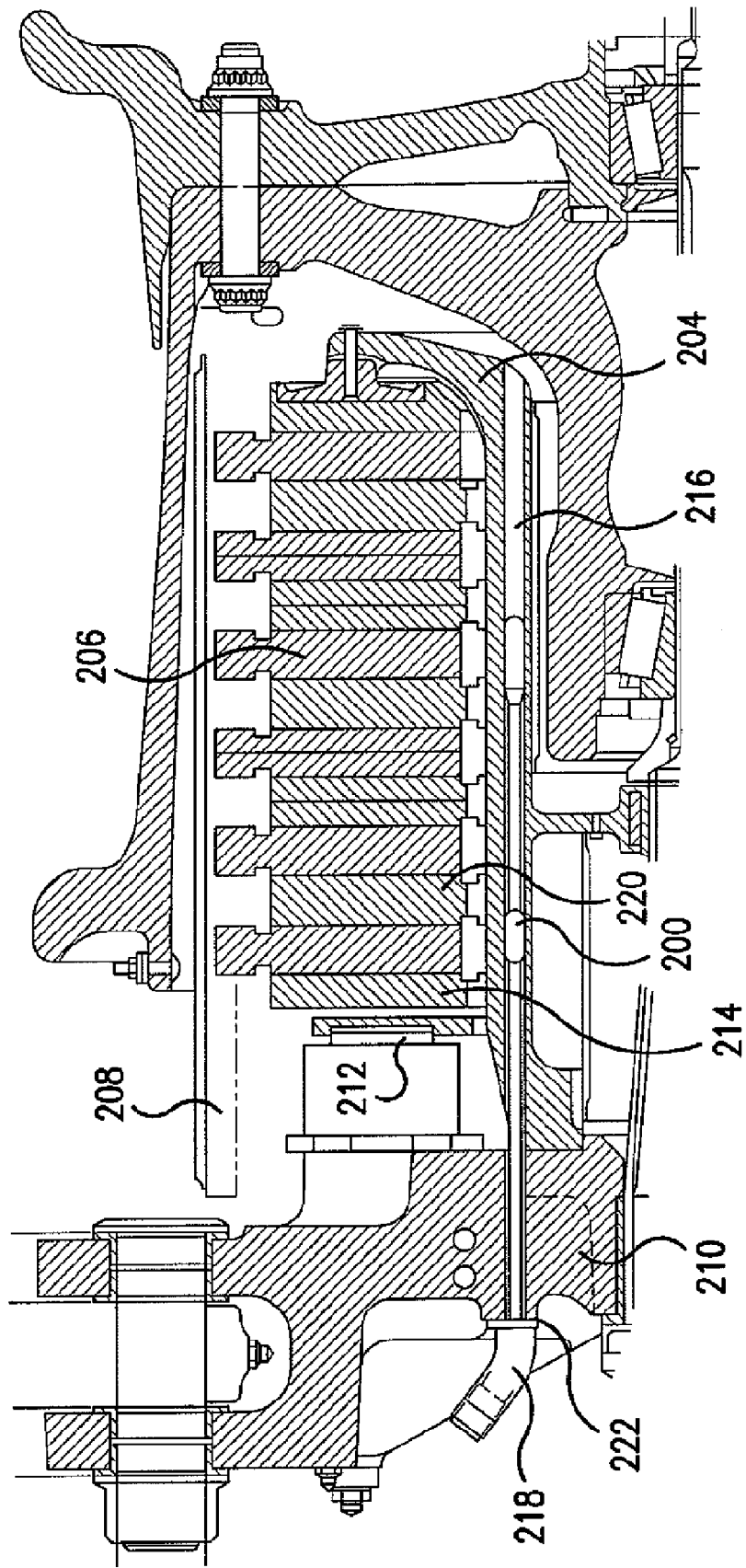
FIG. 4 is a sectional side elevational view of a conventional temperature probe mounted in an aircraft brake assembly.

Referring now to the drawings, wherein the showings are for purposes of illustrating embodiments of the invention only and not for the purpose of limiting same, FIG. 1 illustrates a portion of an aircraft brake assembly designated generally by the numeral 10. Brake assembly 10 is generally similar to the brake assembly illustrated in FIG. 4, and only the portion of the brake assembly in the vicinity of the improved temperature sensor of an embodiment of the present invention is illustrated in the Figures. Brake assembly 10 includes a piston housing 12 having a passage 14 connected to a torque tube 16 having a passageway 18. Passageway 18 has a width W and is aligned with passage 14. A temperature probe 20 is also provided and includes an outer or connector end 22 having a flange 24, a bushing 26 extending from flange 24, a tubular portion 28 extending from bushing 26, and a temperature sensor 30 at the other end of the tubular portion 28 from bushing 26. The interior of the tubular portion 28 is hollow, and one or more wires 32 run through the temperature probe 20 from the temperature sensor 30 through connector end 22.

Figure 2:
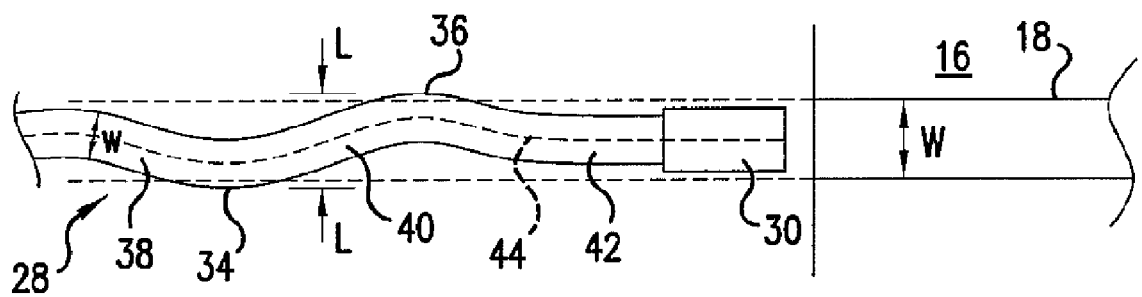
FIG. 2 is a side elevational view of the temperature probe of FIG. 1 aligned with a passageway.

FIG. 2 illustrates temperature probe 20 generally aligned with, but not inserted into, passageway 18 of torque tube 16. For clarity of illustration, piston housing 12 is not shown. Tubular portion 28 of the temperature probe 20 includes a first angled portion 34, a second angled portion 36, a first linear portion 38 between flange 24 and first angled portion 34, a second linear portion 40 between first angled portion 34 and second angled portion 36, and a third linear portion 42 between second angled 36 and temperature sensor 30. A centerline 44 of temperature probe 20 is also illustrated which centerline changes direction at each of the first and second angled portions 34, 36. Tubular portion 28 of the temperature probe 20 has a width w.

First and second angled portions 34, 36 give the temperature probe 20 a lateral offset L comprising the separation between parallel lines tangential to the first and second angled portions 34, 36. Stated differently, if the temperature probe were wave shaped, the lateral offset would correspond to twice the wave's amplitude. The drawings are not to scale, and the angle of the first and second angled portions 34, 36 of the temperature probe and the difference between lateral offset L and passageway width W are exaggerated for illustration purposes. The temperature probe may be cast or otherwise formed to have first and second angled portions 34, 36, but, more often, the tubular portion of the temperature probe will be formed in a linear shape and then bent in a well known manner to form the first and second angled portions 34, 36. As used herein, the term "bent" refers to the shape of the temperature probe and not to the manner that the shape was created. In either case, the metal or metal alloy from which the tubular portion is formed will have sufficient resiliency so as to resist the compression of the lateral offset, generate a return force when compressed, and spring back to substantially the original shape once a force holding the lateral offset in compression is released.

The unflexed lateral offset L of temperature probe 20 is greater than the width W of passageway 18. Therefore, in order to insert the temperature probe 20 into passageway 18, the lateral offset L of the probe must be reduced to L' by flexing or compressing the tubular portion 28 of the temperature probe 20 at the first and second angled portions 34, 36. This may be accomplished, for example, by placing temperature sensor 30 into passageway 18 and applying axial pressure against connector end 22 to compress the lateral offset L to a lateral offset L' as the temperature probe 20 is forced into the passageway 18. It may also be beneficial to flex the portion of the temperature probe 20 at the entrance of passageway 18 to facilitate the insertion of the temperature probe 20 into the passageway 18.

Figure 3:
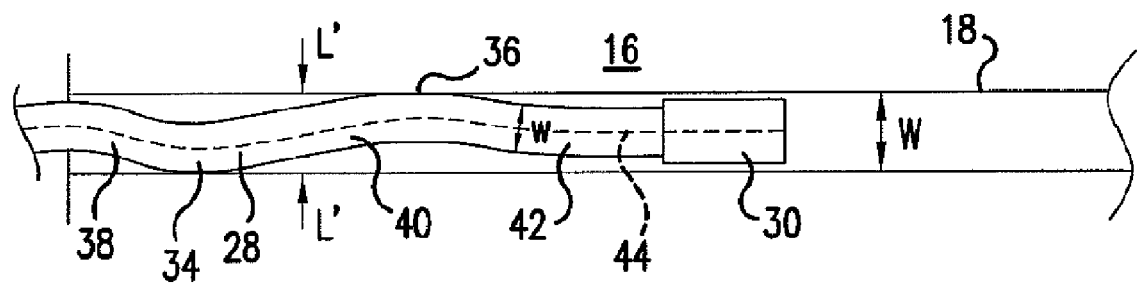
FIG. 3 is a side elevational view of the temperature probe of FIG. 2 inserted into the passageway of FIG. 2.

As illustrated in FIG. 3, after insertion, the lateral offset L' of the temperature probe 20 will be substantially the same as the width W of passageway 18. It will be appreciated that when torque tube 16 is mounted on a piston housing 12, the temperature probe 20 will be inserted into passage 14 of the piston housing before reaching passageway 18 of the torque tube. When fully inserted, flange 24 of the temperature probe 20 is secured to the piston housing 12 to hold the temperature probe 20 in place axially. The first linear portion 38 of tubular portion 28 is spaced from the walls of the passageway 18 and angled toward a first location on the wall of the passageway 18, second linear portion 40 of tubular portion 28 is spaced from the walls of the passageway 18 and angled toward the first location, and first angled portion 34 of tubular portion 28 is located between the first and second linear portions 38, 40 and contacts the wall of the passageway at the first location. Similarly, second linear portion 40 is also angled toward a second location on the wall of passageway 18, third linear portion 42 of tubular portion 28 is angled toward the second location, and second angled portion 36 of tubular portion 28 is located between second linear portion 40 and third linear portion 42 and contacts the wall of the passageway at the second location.

Because of the resiliency of the material forming the temperature probe 20, and specifically, the tubular portion 28 of the temperature probe 20, the tubular portion 28 will exert a force against the wall of passageway 18 as it attempts to return to its uncompressed shape. This outward pressure maintains the first and second angled portions 34, 36 in contact with the passageway 18. This contact, in turn, damps vibration and reduces or eliminates the high cycle fatigue that occurred in conventional temperature probes supported in a cantilevered manner. Moreover, the temperature probe of this embodiment can readily be removed from the brake assembly for maintenance of the brake assembly and/or inspection of the temperature probe and reinserted into the brake assembly without damage to either the temperature probe 20 or the brake assembly. If the angles of the first and second angled portions 34, 36 are changed when the temperature probe 20 is removed from the brake assembly, the tubular portion 28 of the temperature probe 20 can be reworked or re-bent to return the tubular portion to a shape having a larger lateral offset than the width W of passageway 18. The new or reworked shape does not need to be identical to the original shape.

Temperature probe 20 is illustrated with first and second angled portions 34 and 36. However, the number of angled portions can be less than or greater than two without exceeding the scope of the present invention. For example, if a single angled portion is provided, the temperature probe would be generally V shaped, and the temperature sensor 30 and a portion of bushing 26 would engage the walls of the passage or passageway. Likewise, especially in applications requiring probes having relatively long tubular portions, three or more angled portions could be used to provide support along the entire length of the temperature probe.

The present invention has been described herein in terms of presently preferred embodiments. However, obvious modifications and additions to these embodiments will become apparent to those skilled in the relevant arts upon a reading of the foregoing disclosure. It is intended that all such additions and modifications form a part of the present invention to the extent they fall within the scope of the several claims appended hereto.

What is claimed is:

1. A method comprising:
    inserting a temperature probe into a passageway of a torque tube of an aircraft brake assembly, the passageway having a passageway width and a passageway length, and the temperature probe having a probe width less than the passageway width and including a plurality of angled portions where a centerline of the temperature probe changes direction, the plurality of angled portions defining a lateral offset of the temperature probe, wherein the temperature probe is flexible between a first shape and a second shape, wherein the lateral offset of the temperature probe is greater than the passageway width when the temperature probe is in the first shape; and wherein inserting the temperature probe into the passageway flexes the temperature probe from the first shape to the second shape such that the lateral offset of the temperature probe is substantially the same as the passageway width when the temperature probe is in the second shape;

whereby the passageway holds the temperature probe in the second shape against a return force generated by the flexed temperature probe.

2. The method of claim 1, further comprising mounting a piston housing having a passage on the torque tube with the passage aligned with the passageway; wherein inserting the temperature probe into the passageway includes inserting the temperature probe through the passage.

3. The method of claim 2, further comprising connecting the temperature probe to the piston housing.

4. The method of claim 1, wherein the temperature probe includes a temperature sensor, the method further comprising connecting at least one wire to the temperature sensor and extending the wire through an interior of the temperature probe.

5. The method of claim 1, wherein the plurality of angled portions are positioned along a substantially entire length of the temperature probe, wherein the passageway wall holds the substantially entire length of the temperature probe in the second shape when the temperature probe is inserted into the passageway.

6. An aircraft brake assembly comprising:

a torque tube having a passageway for receiving a temperature probe, the passageway having a passageway wall, a passageway width, and a passageway length; and a temperature probe having a probe width less than the passageway width and a plurality of angled portions where a centerline of the temperature probe changes direction, the plurality of angled portions defining a lateral offset of the temperature probe, wherein the temperature probe is flexible between first shape and a second shape, wherein the lateral offset of the temperature probe is greater than the passageway width when the temperature probe is in the first shape and the lateral offset of the temperature probe is substantially the same as the passageway width when the temperature probe is in the second shape; and wherein the temperature probe is configured to be mounted in the passageway and held in the second shape by the passageway wall.

7. The aircraft brake assembly of claim 6, further including a piston housing having a passage mounted on the torque tube with the passage aligned with the passageway, wherein the temperature probe extends into the passage.

8. The aircraft brake assembly of claim 6, wherein the temperature probe includes a flange connected to the piston housing.

9. The aircraft brake assembly of claim 6, wherein the temperature probe includes a temperature sensor and at least one wire connected to the temperature sensor and extending though an interior of the temperature probe.

10. The aircraft brake assembly of claim 6, wherein the temperature probe is tubular.

11. The aircraft brake assembly of claim 6, wherein the plurality of angled portions are positioned along substantially an entire length of the temperature probe, wherein the substantially entire length of the temperature probe is mounted in the passageway and held in the second shape by the passageway wall when the temperature probe is inserted into the passageway.

12. A temperature probe for an aircraft brake assembly including a torque tube having a passageway for receiving the temperature probe, the passageway having a passageway wall, a passageway width, and a passageway length, the temperature probe comprising:

a temperature probe body comprising a probe width less than the passageway width and a plurality of angled portions where a centerline of the temperature probe body changes direction, the plurality of angled portions defining a lateral offset, wherein the temperature probe body is flexible between a first shape and a second shape;

wherein the lateral offset of the temperature probe body is greater than the passageway width when the temperature probe body is in the first shape and the lateral offset of the temperature probe body is substantially the same as the passageway width when the temperature probe body is in the second shape; and wherein the temperature probe body is configured to be mounted in the passageway and held in the second shape by the passageway wall.

13. The temperature probe of claim 12, wherein the aircraft brake assembly further includes a piston housing having a passage mounted on the torque tube with the passage aligned with the passageway, wherein the temperature probe is configured to extend into the passage.

14. The temperature probe of claim 12, wherein the temperature probe body further comprises a flange configured to be connected to the piston housing.

15. The temperature probe of claim 12, wherein the temperature probe body further comprises a temperature sensor and at least one wire connected to the temperature sensor and extending through an interior of the temperature probe body.

16. The temperature probe of claim 12, wherein the temperature probe body is tubular.

17. The temperature probe of claim 12, wherein the plurality of angled portions are positioned along a substantially entire length of the temperature probe body, wherein the substantially entire length of the temperature probe body is mounted in the passageway and the substantially entire length of the temperature probe body is held in the second shape by the passageway wall when the temperature probe is inserted into the passageway.

* * * * *